United States Patent [19]
Cosentino

[11] Patent Number: 5,727,762
[45] Date of Patent: Mar. 17, 1998

[54] RISER CLAMP AND METHOD OF FABRICATING SAME

[75] Inventor: Christopher Cosentino, Bolton, Canada

[73] Assignee: Centro Manufacturing Inc., Etobicoke, Canada

[21] Appl. No.: 755,948

[22] Filed: Nov. 25, 1996

[51] Int. Cl.[6] .................................................. A47B 96/06
[52] U.S. Cl. .................. 248/231.61; 248/154; 248/316.6
[58] Field of Search .................. 248/231.61, 154, 248/229.14, 229.24, 228.5, 230.5, 316.6, 218.4, 229.2, 227.3, 230.1, 231.85; 52/220.8, 704; 256/65; 403/398

[56] References Cited

U.S. PATENT DOCUMENTS

| | | | |
|---|---|---|---|
| 3,385,545 | 5/1968 | Patton | 248/228.5 X |
| 3,888,354 | 6/1975 | Margolin et al. | 248/231.61 X |
| 5,570,880 | 11/1996 | Nordgran | 248/218.4 X |

Primary Examiner—Ramon O. Ramirez
Attorney, Agent, or Firm—Mirek A. Waraksa

[57] ABSTRACT

A low-weight riser clamp has a pair of clamp members stamped from metal strips. Each metal strip is bent lengthwise to define an elongate base strip and a pair of opposing lengthwise flanges. The base strip is bent to define between the flanges a substantially semi-circular central arch, a pair of coplanar arms that extend laterally in opposite directions from the central arch, and a pair of tabs each extending laterally away from the arms. The arch and the flanges extend in the same general direction from the metal strip, and each tab is offset from its associated arm in an opposite general direction. Clearance holes are formed in the arms to pass bolts. When installed about a riser, the tabs of the clamp members abut one another to space the arms of the clamp horizontally. Thus, as the bolts are tightened, the butted tabs serving as fulcrums about which the arms deflect, permitting more reliable gripping of the riser. The configuration of the clamp permits a significant reduction of material costs without a significant increase in manufacturing costs.

10 Claims, 2 Drawing Sheets

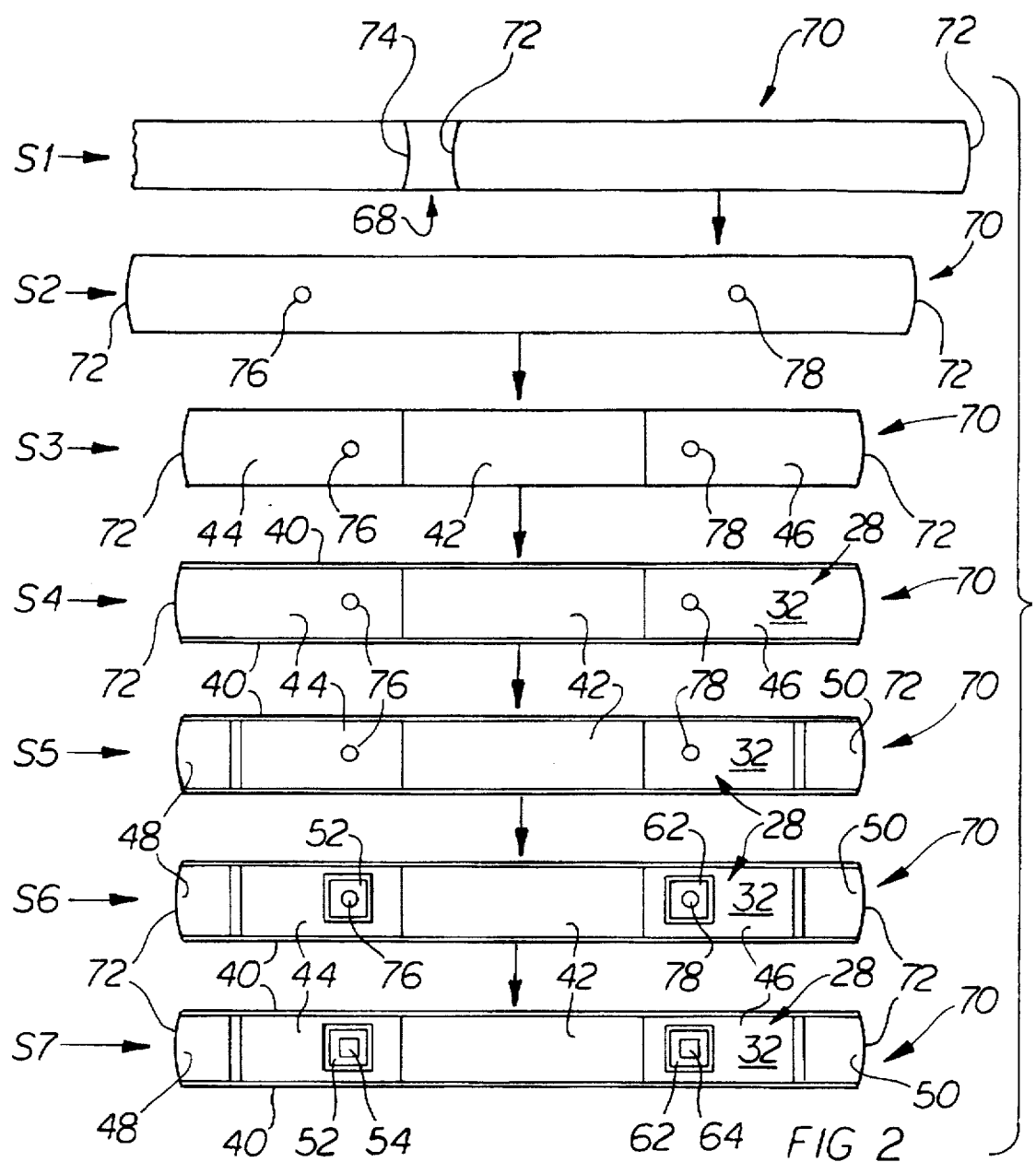
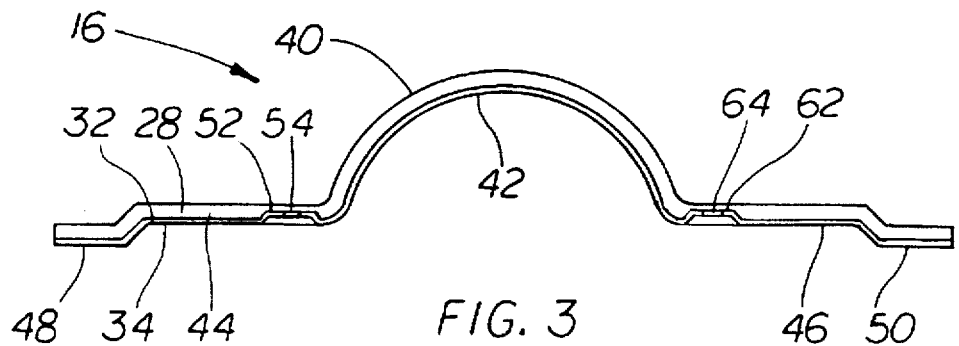

5,727,762

1

RISER CLAMP AND METHOD OF FABRICATING SAME

FIELD OF THE INVENTION

The invention relates to clamps used to support risers in highrise buildings.

BACKGROUND OF THE INVENTION

Riser clamps are well known and have had the same basic two-part construction for decades. Clamp members are cut from steel plate, bent centrally to define a part-circular arch with two lateral arms, and pierced to provide bolt clearance holes in each arm. Two such clamp members are rested on a horizontal supporting surface surrounding the riser, such as a steel plate mounted in a floor, with their arched sections seated about the riser. Bolts are extended through the clearance holes and used to draw the arms of the two clamp members together so that their arched sections grip the riser.

The manufacturing steps associated with production of prior art riser clamps are simple and inexpensive. Since the clamp members must react substantial forces, the strips of solid steel plate used to construct the members will typically have a thickness of three-eighths to one-half inches and a width of about two to three inches, and are thus fairly heavy. As well, solid plate construction and imprecise forming are not conducive to reliable gripping. In use, a workman may spend considerable time tightening bolts to try to ensure that a riser is adequately gripped. Basically, such prior art riser clamps represent a trade-off favoring reduction of fabricating costs over material costs and ease of use.

SUMMARY OF THE INVENTION

The invention provides a riser clamp whose members are configured to reduce material requirements yet permit comparatively low-cost fabrication, largely by bending of metal stock as in stamping operations.

In one aspect, the invention provides a riser clamp comprising a pair of clamp members adapted to be secured with fasteners, such as conventional bolts, about a riser. Each clamp member is fabricated from an elongate metal strip bent lengthwise to define an elongate base strip and a pair of reinforcing flanges that extend in one general direction relative to the base strip. The base strip is bent to define between the pair of flanges a substantially semi-circular central arch (an arch of constant radius extending through a sector angle of slightly less than 180 degrees) that rises in the one general direction relative to the base strip, a pair of arms that extend laterally from the central arch in opposite lateral directions, and a pair of mounting tabs each extending laterally away from a different one of the arms. Each arm is offset in the one general direction from the tab that extends from the arm or, alternatively viewed, each tab is offset from the arm in a general direction opposite to the one general direction. Clearance holes are formed in the arms for purposes of passing the fasteners.

The lengthwise flanges impart structural rigidity and reduce material requirements. The mounting tabs of one clamp member are butted against the mounting tabs of the other clamp member when the clamp is assembled about the riser, spacing the arms and arches of the clamp members horizontally. This permits the clamp members to be drawn in a more positive fashion about the riser, the butted tabs serving as fulcrums about which pairs of arms deflect toward one another during tightening of the fasteners. Since features are produced by largely by bending, the clamp members can be made by comparatively low-cost stamping operations. Stamping imparts more precise geometry and dimensions to the clamp members, and the clamp members can consequently fit a riser more precisely, reducing the need to tighten fasteners excessively.

In another aspect, a method of producing a riser clamp with a pair of clamp members, in which the making of each clamp member comprises forming an elongate metal strip, stamping the metal strip to form a lengthwise pair of reinforcing flanges and an elongate base strip between the flanges, stamping the metal strip to form a substantially semi-circular central arch that peaks and a pair of substantially coplanar arms extending away from the arch in laterally opposite directions, and piercing the metal strip to form a pair of clearance holes that ultimately locate in arms. In the finished clamp member, the flanges extend in one general direction relative to the base strip, the arch rises in the one general direction, and the arch and the arms are located between and thus reinforced by the flanges. The metal strip is preferably stamped to define a pair of substantially coplanar mounting tabs offset relative to the rest of the clamp member in an opposite general direction and each located at a different end of the metal strip. To further reinforce the clamp member, the metal strip is preferably stamped to form about each clearance hole a bolt mounting structure that protrudes in the one general direction. This enhances resistance of the clamp members to local deflection in response to tightening of bolts in their clearance holes. It should be noted that steps may be performed in different orders and may be combined.

Other aspects of the invention will be apparent from a description below of a preferred embodiment and will be more specifically defined in the appended claims.

DESCRIPTION OF THE DRAWINGS

The invention will be better understood with reference to drawings in which:

FIG. 2 illustrates successive steps in the fabrication of a clamp member; and,

FIG. 3 is a central lengthwise cross-section of the clamp member further detailing features.

DESCRIPTION OF PREFERRED EMBODIMENTS

Figure 1:
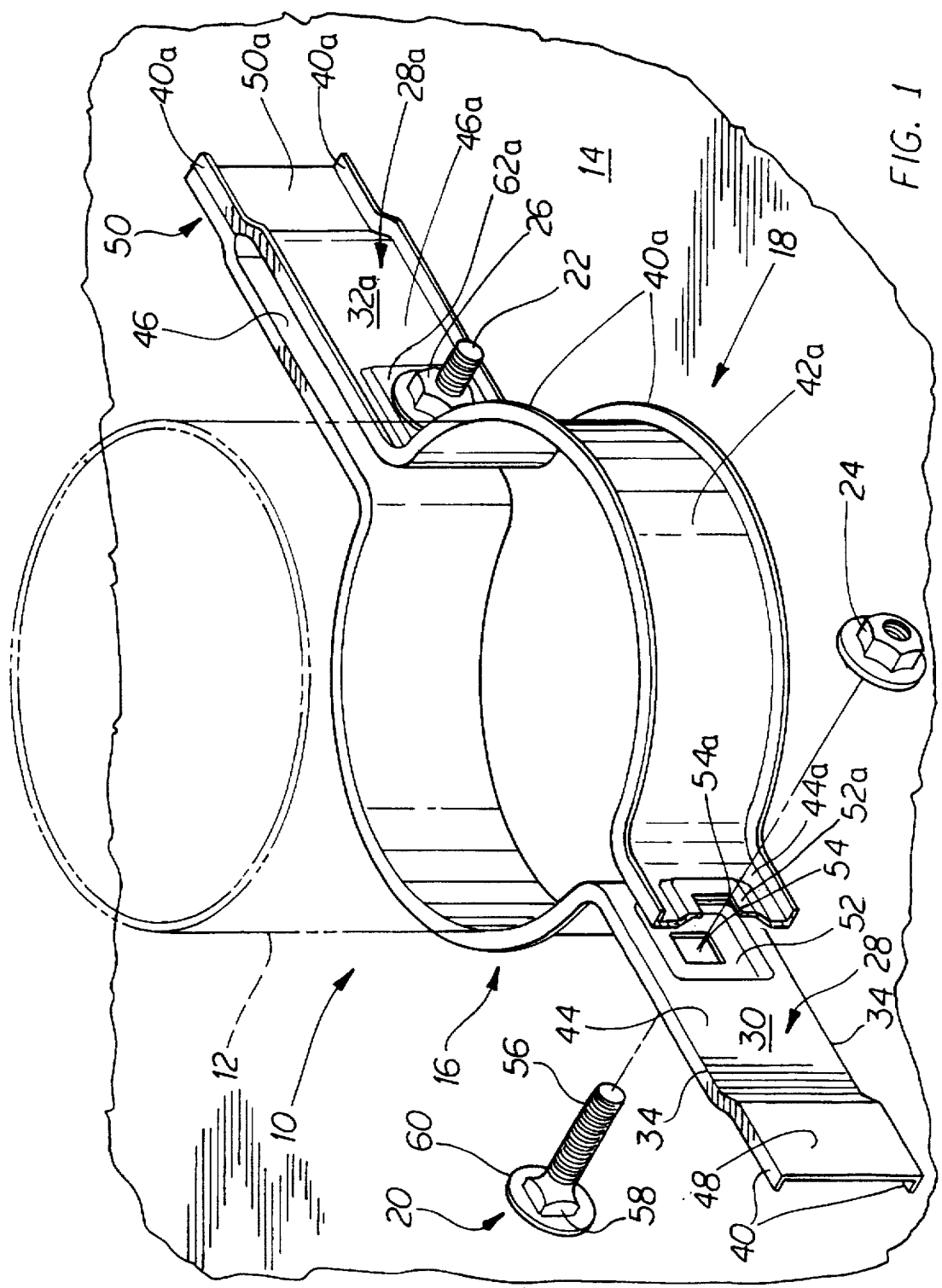
FIG. 1 is a fragmented, partially-exploded perspective view showing a riser clamp supporting a riser from a horizontal surface surrounding the riser.

Reference is made to FIG. 1 which shows a riser clamp 10 supporting a riser 12 (in phantom outline) of predetermined radius. The riser 12 is gripped within the interior of the clamp 10, and the riser clamp 10 bears downwardly against a horizontal surface 14 which is typically defined by a steel plate surrounding the riser 12 and supported by a concrete floor. The riser clamp 10 comprises a pair of identical clamp members 16, 18 secured to the riser 12 with a pair of bolts 20, 22 and nuts 24, 26.

One clamp member 16 is illustrated throughout FIGS. 1–3. The clamp member 16 comprises an elongate base strip 28 with an inner face 30, an outer face 32, and a pair of lengthwise side edges 34. Opposing reinforcing flanges 40 extend lengthwise along the opposing side edges 34 of the base strip 28. The flanges 40 are oriented substantially at right angles to the base strip 28 and extend in an outward general direction relative to the base strip 28. The base strip 28 is bent centrally to define an arch 42 and a pair of coplanar arms 44, 46 that extend laterally in opposite directions from the arch 42. The arch 42 is substantially semi-circular with a radius corresponding to the radius of the riser 12 and extends or rises in the outward general direction. The base strip 28 is bent proximate to its ends 36 to define a pair of coplanar mounting tabs 48, 50 which extend laterally away from the arms 44, 46 and which are offset in an inward general direction relative to the rest of the clamp member 16. Since the arch 42, arms 44, 46 and mounting tabs 48, 50 are all formed between the flanges 40, the clamp member 16 is reinforced at all critical points along its length against buckling.

A bolt mounting structure 52 is formed in one arm 44 of the clamp member 16 and protrudes in the outward general direction relative to the base strip 28. A square clearance hole 54 is formed centrally in the bolt mounting structure 52. The clearance hole 54 is dimensioned pass the shaft 56 of the bolt 20 and to closely receive a square locating structure 58 associated with the head 60 of the bolt 20. A similar bolt mounting structure 62 and clearance hole 64 are formed in the other arm 46 of the clamp member 16, as apparent in FIG. 3.

Since the clamp members 16, 18 are identical, features of the other clamp member 18 corresponding to features in clamp member 16 have been identified where apparent in FIG. 1 with the same reference numerals following by the letter "a."

To install the riser clamp 10, the clamp members 16, 18 are rested on the supporting surface 14 surrounding the riser 12 with their arches 42, 42a located about the riser 12, their mounting tabs butted against one another, and their arms 44, 44a, 46, 46a in horizontally registered pairs. The bolt 20 is extended through the clearance holes 54, 54a in the registered pair of arms 44, 44a and secured with the nut 24. The bolt 22 is similarly extended through the registered pair of arms 46, 46a and secured with the nut 26. The nuts 24, 26 are then rotated to draw the two clamp members 16, 18 together. The offsetting of the mounting tabs relative to the rest of their respective clamp member 16 or 18 ensures that the arms 44, 44a, 46, 46a are horizontally spaced and allows the mounting tabs to function as fulcrums during tightening of the bolts 20, 22. For example, the registered pair of arms 46, 46a deflect toward one another about the butted mounting tabs 50, 50a to draw the arches 42, 42a tightly about the riser 12 when the bolt 22 is tightened. It should be noted that the bolt 22 is closer to the arches 42, 42a than to the mounting tabs 50, 50a providing a longer lever arms that encourage pivoting of the arches 42, 42a relative to the mounting tabs 50, 50a. Thus the riser clamp 10 can grip the riser 12 more reliably than the prior art clamps. The bolt mounting structures 52, 52a, 62, 62a reduce local deformation of the arms 44, 44a, 46, 46a about the clearance hole 54, 54a, 64, 64a in response to bolt tightening and thus further ensure that the riser clamp 10 grips the riser 12 reliably. The clearance holes 54, 64 are dimensioned to closely receive (with minimal clearance) the locating structures of the bolts 20, 22 to encourage proper reaction of tightening forces into the mounting structures.

A process for fabricating clamp members is illustrated in FIG. 2 and will be described with reference to fabrication of the clamp member 16. Seven successive processing steps S1–S7 have been indicated in FIG. 2 by showing clamp features stamped at each step. Reference characters identifying such features have been duplicated at each step S1–S7 to indicate progression to the final clamp 16.

In an initial step S1, steel stock 66 is cut at location 68 to form a metal strip 70 of predetermined length with opposing rounded ends 72 (one rounded end 74 of the next metal strip being simultaneously cut, and one rounded end 72 of the strip 70 being cut in a previous cutting step). In a succeeding step S2, the strip 70 is pierced by stamping to produce two circular clearance hole 76, 78 at predetermined distances from each end of the metal strip 70. The positions of the hole 76, 78 are selected to correspond to locations in the arms 44, 46 that will eventually be formed, proximate to the central arch 42 to be formed. In a succeeding step S3, the metal strip 70 is stamped to define the central arch 42 and the coplanar arms 44, 46 extending laterally from the central arch 42. In step S4, the metal strip 70 is stamped to define the flanges 40 and the base strip 28, effectively bending the metal strip 70 lengthwise to raise the flanges 40 relative to the base strip 28 in the outer general direction. In a succeeding step S5, the metal strip 70 is stamped to produce bends adjacent each of its ends 72, which define the tabs 48, 50 and offset the tabs 48, 50 in the opposite general direction. In a succeeding step S6, the metal strip 70 is stamped to raise the bolt mounting structure 52, 62 from the base strip 28. In a final step S7, the metal strip 70 is stamped to expand the circular clearance hole 76, 78 and impart a square shape to define the final clearance hole 54, 64. Details regarding implementation of the successive die stamping operations will be apparent to those skilled in the art.

The meaning of certain terms used in this specification will be apparent from the description of the preferred embodiments. The term "riser" is used in a conventional manner to indicate a vertical pipe of circular cross-section. The terms "inner" and "outer" and directions such as "inward" and "outward" should be understood with reference to the interior and exterior of the assembled clamp. The term "general direction" as used with respect to a thin strip-like structure with opposing faces, such as a starting metal strip or a base strip, should be understood as meaning a direction leading away from one face or an opposite direction leading away from the other face of the structure.

It will be appreciated that particular embodiments of the invention have been described and that modifications may be made therein without departing from the spirit of the invention or necessarily departing from the scope of the appended claims.

I claim:

1. A riser clamp comprising a pair of clamp members adapted to be secured with a pair of fasteners about a riser, in which each of the clamp members comprises an elongate metal strip and in which:

the metal strip is bent lengthwise to define a pair of opposing peripheral flanges and an elongate base strip between the flanges;

the base strip is bent to define between the flanges a substantially semi-circular central arch, a pair of arms extending laterally in opposite directions from the central arch, and a pair of tabs each extending laterally away from a different one of the arms;

the arch rises in a predetermined general direction relative to the base strip, the flanges extend transversely relative to the base strip in the predetermined general direction, and each of the arms is offset in the predetermined general direction relative to the tab that extends from the arm; and, each of the arms comprises a clearance hole for passing one of the fasteners.

2. The clamp assembly of claim 1 in which in at least one of the clamp members:

each of the arms comprises a fastener mounting structure bent from the base strip and protruding in the predetermined direction from the base strip; and, the clearance hole of each of the arms is formed centrally in the fastener mounting structure of the arm.

3. The clamp assembly of claim 2 adapted to be secured with a pair of identical bolts each of which has a head formed with a square locating structure, in which the clearance hole formed centrally in each of the mounting structures is square and dimensioned to closely receive the locating structure.

4. The riser clamp of claim 1 in which, in each of the clamp members, the arms are substantially coplanar and the tabs are substantially coplanar.

5. In combination with a riser, a riser clamp supporting the riser from a horizontal surface, the riser clamp comprising:

a pair of clamp members, each of the clamp members comprising an elongate metal strip bent lengthwise to define a pair of reinforcing flanges and an elongate base strip between the flanges, the base strip being bent to define between the flanges a substantially semi-circular central arch, a pair of arms extending laterally in opposite directions away from the central arch and each comprising a clearance hole, and a pair of tabs each extending laterally away from a different one of the arms, the flanges extending outwardly relative to the base strip, each of the tabs offset inwardly relative to the arm from which the tab extends;

the clamp members located about the riser such that the arches of the clamp members are seat about the riser with each of the arms of one of the clamp members registered horizontally with a different one of the arms of the other of the clamp members and with each of the tabs of the one clamp member butted against a different one of the tabs of the other clamp member thereby to maintain horizontal spacing between the registered arms; and, a pair of bolts securing the clamp members to the riser, each of the bolts extending through the clearance hole of a different one of the arms of the one clamp member and through the clearance hole in the arm of the other clamp member horizontally registered therewith.

6. The riser and riser clamp combination of claim 6 in which, in each of the clamp members:

each of the arms comprises a bolt mounting structure bent from the base strip and protruding in the predetermined direction from the base strip; and, the clearance hole of each of the arms is formed centrally in the bolt mounting structure of the arm.

7. The riser and riser clamp combination of claim 7 in which each of the bolts comprises a head formed with an identical square locating structure and in which the clearance hole formed centrally in each of the mounting structures is square and dimensioned to closely receive the locating structure.

8. A method of making a riser clamp comprising a pair of clamp members, in which the making of each of the clamp members comprises:

(a) forming an elongate flat metal strip;

(b) stamping the metal strip to form therein a lengthwise pair of opposing flanges and an elongate base strip between the flanges;

(c) stamping the metal strip to form therein a substantially semi-circular central arch and a pair of substantially coplanar arms extending away from the arch in laterally opposite directions; and, (d) piercing the metal strip to form therein a pair of clearance holes such that each of the holes locates in a different one of the arms;

the steps (b) and (c) bending the flanges and the arch in one general direction relative to the base strip.

9. The method of claim 8 comprising, in the making of each of the clamp members, stamping the metal strip to define a pair of substantially coplanar mounting tabs offset relative to the rest of the clamp member in a general direction opposite to the one general direction and each located at a different end of the metal strip between the flanges.

10. The method of claim 8 comprising, in the making of each of the clamp members, stamping the metal strip to form about each of the clearance holes a bolt mounting structures that protrudes in the one general direction.

* * * * *